US006123044A

United States Patent [19]

Kuklinski

[11] Patent Number: 6,123,044

[45] Date of Patent: Sep. 26, 2000

[54] WAKE BUBBLE COALESCING SYSTEM

[75] Inventor: Robert Kuklinski, Portsmouth, R.I.

[73] Assignee: The United States of America as represented by the Secretary of the Navy, Washington, D.C.

[21] Appl. No.: 09/110,733

[22] Filed: May 29, 1998

[51] Int. Cl.[7] .......................... B63G 13/00; B01D 19/00; B01D 51/08

[52] U.S. Cl. .................................. 114/15; 95/30; 96/389

[58] Field of Search ............................ 114/15, 330, 337, 114/20.1; 95/29, 30; 96/389; 210/748

[56] References Cited

U.S. PATENT DOCUMENTS

| | | | |
|---|---|---|---|
| 4,398,925 | 8/1983 | Trinh | 55/15 |
| 5,117,882 | 6/1992 | Stanford | 114/67 A |
| 5,613,456 | 3/1997 | Kuklinski | 114/67 A |
| 5,688,405 | 11/1997 | Dickinson | 210/748 |
| 5,831,166 | 11/1998 | Kozuka | 73/570 |

*Primary Examiner*—Jack W. Lavinder

*Attorney, Agent, or Firm*—Michael J. McGowan; James M. Kasischke; Prithvi C. Lall

[57] ABSTRACT

A system is provided to coalesce bubbles in the wake of a structure that pierces the surface of the water. Acoustic sources mounted to the structure produce a plurality of plane waves above and below the surface of the water. The plane waves intersect to create a plurality of standing wave fields both above and below the surface of the water. The standing wave fields operate on bubbles in the wake to coalesce same.

16 Claims, 3 Drawing Sheets

WAKE BUBBLE COALESCING SYSTEM

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to systems for bubble control, and more particularly to a system for coalescing bubbles in the wake of a structure piercing the surface of the water.

(2) Description of the Prior Art

A moving structure interacting with a free liquid surface produces a surface wake. The complicated fluid flow around a moving structure entrains air bubbles into the flow which ultimately enter the surface wake. The presence of bubbles in the surface wake strongly impact the acoustical properties of the wake. In many instances, it is desirable for surface piercing structures (e.g., surface ships, towed arrays, submarine masts, etc.) to be able to control the acoustical properties of the wakes they generate. One way to manipulate these properties is to control bubble size in the wake.

Bubbles in a wake can be detected acoustically. Accordingly, the longer bubbles are present in a wake, the longer the wake serves as a means of detection. The amount of time that bubbles remain in a wake is primarily a function of the bubble size. Large bubbles rise quickly to the water's surface where they diffuse in the air. However, small bubbles rise much slower. Small bubbles are also more likely to be drawn into persistent large scale vortices. One way to reduce or eliminate bubbles from a wake is to coalesce small bubbles into larger bubbles before they diffuse over a wide area.

Bubbles observed in breaking waves in seawater are on the order of 200 microns in size. Bubbles observed in breaking waves in fresh water are on average 1500 microns in size. Empirical evidence shows that persistent bubbles in fresh water are rare whereas they are common in sea water. Thus, if a cloud of 200 micron bubbles could be changed into a cloud of 1500 micron bubbles relatively quickly, the larger size bubbles could quickly rise to the water's surface and diffuse in air. However, at present, there are no effective means for coalescing small bubbles in a wake to form larger bubbles which will quickly rise to the surface.

U.S. Pat. No. 5,613,456 teaches a microbubble positioning and control system that positions bubbles in a fluid flow. Two spaced-apart acoustic sources are angled towards one another. Acoustic plane waves of differing frequency generated by the acoustic sources intersect to form a standing wave field that sweeps the bubbles in a desired direction. However, this system does not teach a system or method for coalescing small bubbles in a wake to form large bubbles which will quickly rise to the water's surface.

SUMMARY OF THE INVENTION

Accordingly, it is an object of the present invention to provide a system for coalescing bubbles.

Another object of the present invention is to provide a system for coalescing bubbles produced by a moving structure that pierces the surface of a body of water.

Other objects and advantages of the present invention will become more obvious hereinafter in the specification and drawings.

In accordance with the present invention, a system is provided to coalesce bubbles in the wake of a structure that pierces the surface of the water. A first plurality of acoustic sources mounted to the structure produce a corresponding first plurality of plane waves angled downward with respect to the surface of the water. The first plurality of acoustic sources are spaced along at least one plane that pierces the surface of the water. A second plurality of acoustic sources mounted to the structure produce a corresponding second plurality of plane waves angled upward with respect to the surface of the water. The second plurality of acoustic sources are spaced along the same plane as the first plurality of acoustic sources and are further interleaved with the first plurality of acoustic sources. The first and second plurality of plane waves intersect to create a plurality of standing wave fields both above and below the surface of the water. The standing wave fields operate on bubbles in the wake to coalesce same. By providing the standing wave fields both above and below the surface of the water, the present invention will work even if the position of the structure changes relative to the original position of the surface of the water.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
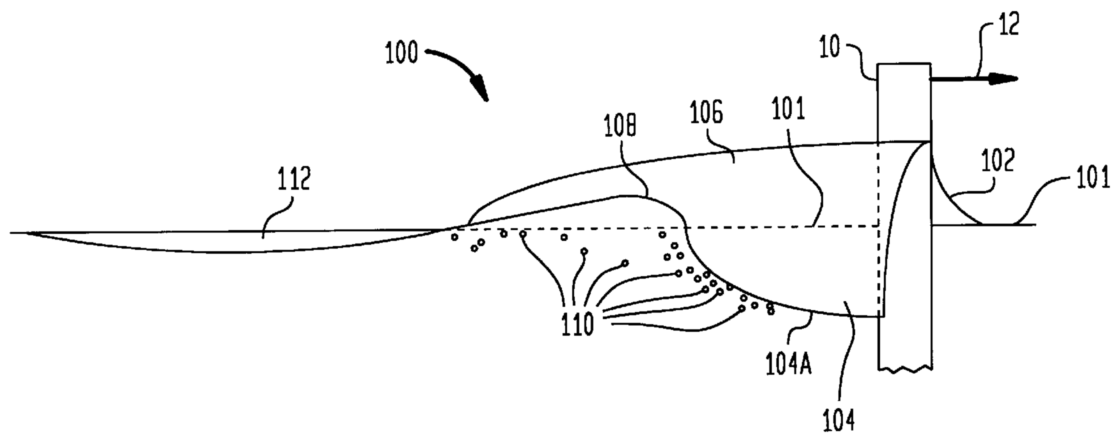
FIG. 1 is a schematic view depicting elements of the flow about a moving mast that is interacting with the free surface of a body of water.

Referring now to the drawings, and more particularly to FIG. 1, a schematic view depicts elements of the flow about a moving structure (e.g., a submarine mast 10) interacting or piercing the original level of free surface 101 of water 100. As mast 10 moves through water 100 in the direction indicated by arrow 12, the flow therearound can be identified by several elements. A bow wave 102 is pushed up above surface 101 forward of mast 10. Aft of mast 10, a wake is formed and includes a ventilation cavity 104 just aft of bow wave 102 below the original level of surface 101 (which is shown as a dashed line aft of mast 10). A volume of spray 106 follows just aft of bow wave 102 above the original level of surface 101. Just aft of ventilation cavity 104, a wave (or rooster tail as it is known in the art) 108 builds above the original level of surface 101. A cloud of bubbles 110 form near the lower edge 104A of ventilation cavity 104. Bubbles 110 are numerous in number and generally range in size from 50–1500 microns in diameter. The smaller bubbles 110 (e.g., 50–500 microns in diameter) remain suspended in water 100 for some time while the larger bubbles 110 rise quickly to surface 101 and diffuse. It is the smaller bubbles 110 that are of interest in the present invention because, left untreated, they will remain suspended in water 100 in an area that may extend for miles behind the mast or ship.

The general features described above are present in most cases where a moving structure pierces the surface of the water. The exact position and magnitude of each feature will vary with sea state, environmental chemistry, structure geometry and speed of travel. It is therefore to be understood that the submarine mast structure is being used herein only for purposes of illustration and does not form a limitation of the present invention.

Figure 2:
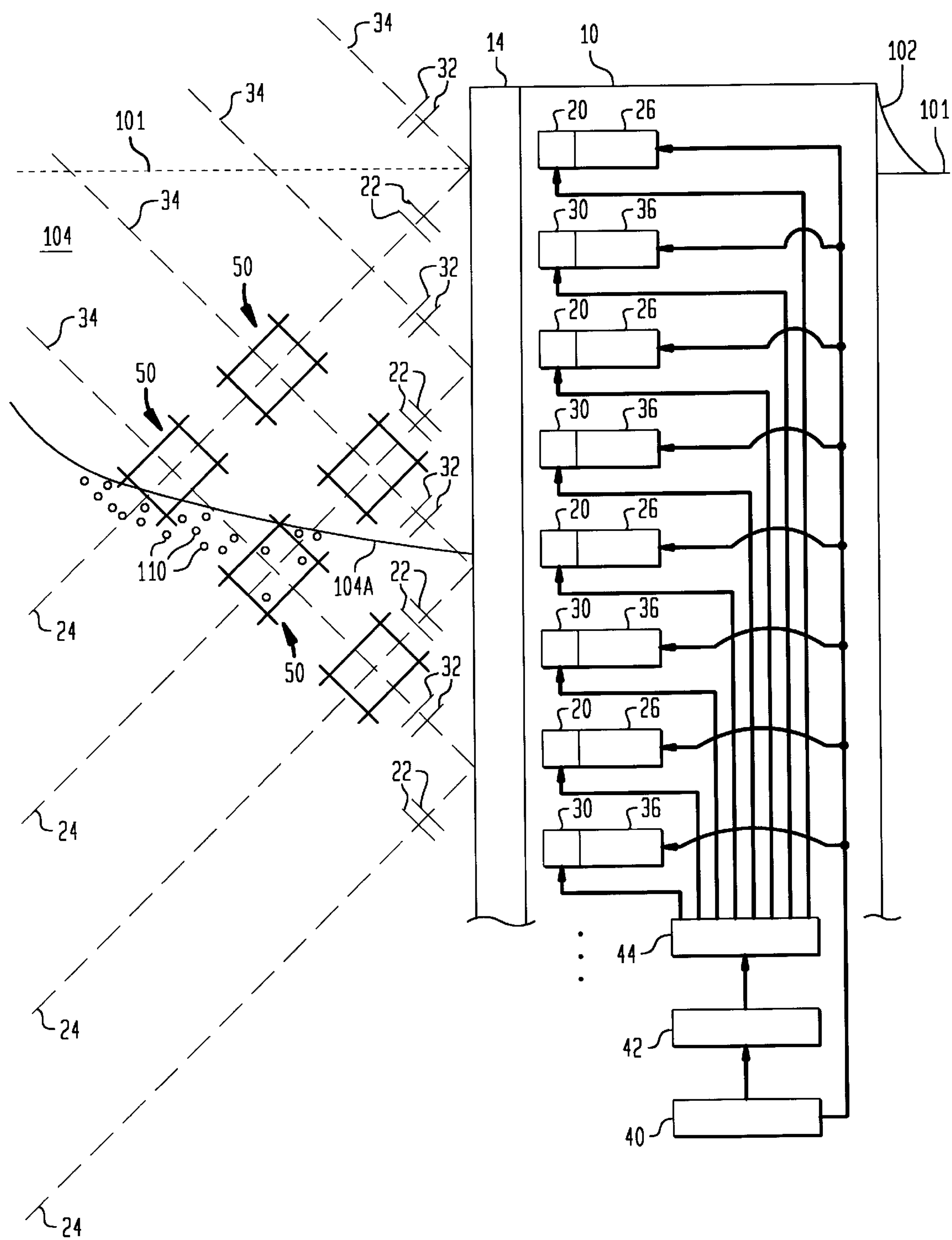
FIG. 2 is a schematic view of the bubble coalescing system of the present invention mounted on one side of a mast.

In FIG. 2, submarine mast 10 is equipped with the bubble coalescing system of the present invention. Spaced along a length of mast 10 is a column of transducers formed by two interleaved groups of transducers 20 and 30 mounted, for example, to mast 10 behind an acoustically transparent wall 14 having an acoustic impedance approximating that of water. Each of first transducers 20 is directed in a plane that pierces surface 101 and can be energized to produce plane waves 22 in that plane. Each of transducers 20 is further positioned to angle its plane waves 22 downward with respect to surface 101. Each of second transducers 30 is generally directed in the same vertical plane as transducers 20 and can be energized to produce plane waves 32 in that same plane. However, each of second transducers 30 is positioned to angle its plane waves 32 upward with respect to surface 101. To energize each of transducers 20 and 30, a controller 40 provides control signals to a signal generator 42 for controlling the shape and frequency of the energizing signals. An amplifier 44 amplifies the energizing signals prior to their receipt by transducers 20 and 30. During bubble coalescence, transducers 20 and 30 can be continuously energized.

Although interleaved transducers are shown in this embodiment, the transducers can also be positioned adjacent to one another. Adjacent vertical columns of transducers would be directed in horizontal planes toward each other to create standing wave fields.

In general, all downward propagation angles formed by plane waves 22 with respect to surface 101 (as indicated by dashed lines 24 which are perpendicular to plane waves 22) are parallel to one another. Similarly, all upward propagation angles formed by plane waves 32 with respect to surface 101 (as indicated by dashed lines 34 which are perpendicular to plane waves 32) are parallel to one another. Since plane waves 22 and 32 are directed towards one another in generally the same plane, the two sets of plane waves intersect to create standing wave interference regions or fields both above and below surface 101 as indicated by solid crossed lines 50. As will be explained further below, the goal of the present invention is to insure that at least one standing wave field 50 will exist in water 10 at or near the area 104A where bubbles 110 are formed beneath ventilation cavity 104.

As illustrated, the upward and downward propagation angles are each approximately 45° with respect to surface 101. However, as will be explained further below, the upward and downward propagation angles can range between 15° and 75° with respect to surface 101. Setting the particular angles can be facilitated by mounting each of transducers 20 and 30 on a motorized pivot mount 26 and 36, respectively. Position of each pivot mount 26 and 36 is controlled by a signal received from controller 40.

Figure 3:
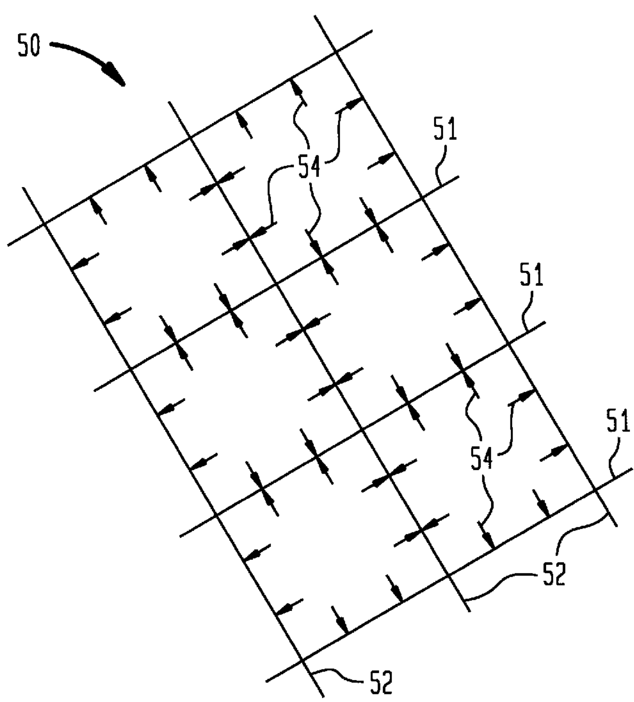
FIG. 3 is a schematic view of a standing wave field created by the present invention.

As indicated in FIG. 3, each standing wave field 50 has crossing nodal lines 51 and 52 along which driving forces are acting as indicated by arrows 54. These nodal lines 51 and 52 can be either nodal or antinodal lines depending on the size of the bubbles and the acoustic wavelength used. If the upward and downward propagation angles are selected such that nodal lines 51 are perpendicular to nodal lines 52, forces 54 will be equal in the vertical and horizontal directions throughout field 50. Further, if the frequency of plane waves 22 and 32 is the same, each standing wave field 50 will be stationary relative to mast 10.

The present invention operates to insure that one or more standing wave fields 50 are resident in bubbles 110 formed just below ventilation cavity 104. Accordingly, transducers 20 and 30 are appropriately provided and positioned along mast 10 such that, regardless of the amount of mast 10 that is piercing surface 101, one or more standing wave fields 50 will be resident just below ventilation cavity 104, i.e., the place where bubbles 110 are formed.

Forces produced along the intersecting nodal lines (e.g., nodal lines 51 and 52) of each standing wave field act on at least some of bubbles 110. In the present invention, it is desirable for bubbles in a desired diameter range to be forced to align along the narrow bands defined by the nodal lines. Forcing the bubbles into the narrow band nodal lines causes the bubbles to coalesce or merge together. Since the acoustic impedance mismatch between a gas bubble and water is great, relatively little energy is needed to cause the bubbles to coalesce.

The magnitude of the forces 54 is partially a function of the acoustic mismatch between bubble and surrounding fluid. However, the magnitude of force 54 is also determined by the relationship between the bubble size(s) to be coalesced and the frequency of plane waves 22 and 32. In terms of bubble coalescence, the wavelength of each standing wave field 50 must be greater than the diameter of the bubbles to be coalesced. For good bubble coalescence, the wavelength of each standing wave field 50 should be should be at least approximately five times the diameter of the bubbles to be coalesced. For example, to coalesce bubbles in the 50–500 micron range, transducers 20 and 30 produce plane waves of frequencies on the order of 1 MHz. Energy requirements are reduced when the frequencies of transducers 20 and 30 are the same so that vertical and horizontal driving forces 54 at the nodal lines 51 and 52 of standing fields 50 are equal. Further, minimal degradation occurs when the upward and downward propagation angles formed by the plane waves 22 and 32 with respect to surface 101 range between 15° and 75°.

Figure 4:
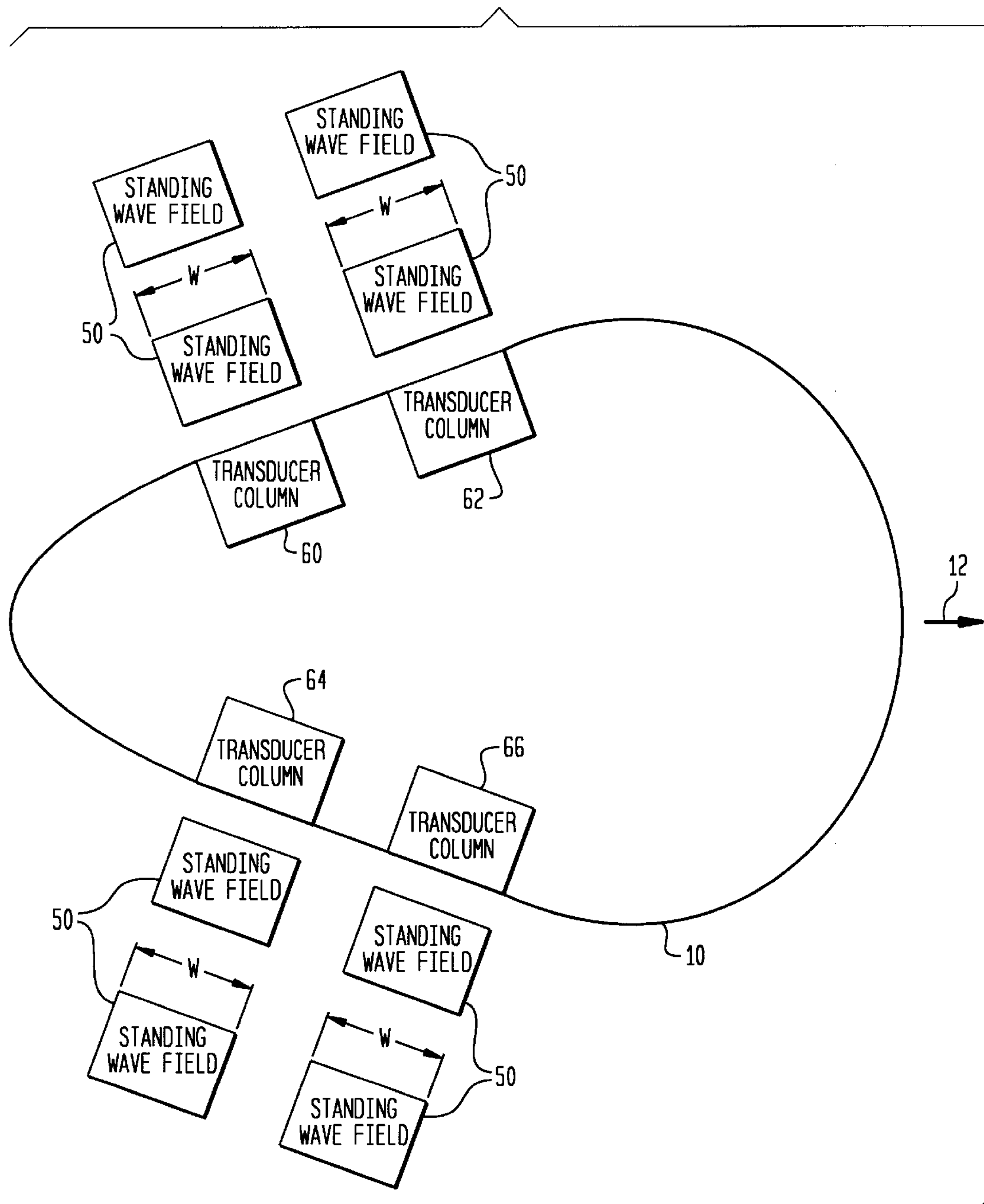
FIG. 4 is a plan view of mast showing placement of multiple columns of transducers for use in the bubble coalescing system.

Formation of bubbles 110 does not occur solely in or near the plane in which transducers 20 and 30 are directed. Accordingly, it would typically be necessary to provide several columns of transducers 20 and 30 strategically placed around mast 10 for bubble coalesce. This is shown by way of example in FIG. 4 which is a plan view of mast 10. Each of transducer columns 60, 62, 64, and 66 is configured similarly to the transducer column described above that is formed by transducers 20 and 30. The width W of any standing wave field 50 is determined by the broadcasting width of the transducers in the column. Note that each transducer in columns 60, 62, 64 or 68 is pivotally mounted relative to mast 10 so that the position of standing wave fields 50 can be moved further forward or aft with respect to mast 10 in accordance with changing conditions.

The advantages of the present invention are numerous. Small bubbles in a wake can be coalesced for rapid ascent in the water and diffusion into the air. Bubble coalescence is achieved regardless of the amount of the moving structure that pierces the free surface of the water. Thus, the present invention will work in changing sea states and for a variety of different structures including submarine masts, ship hulls and towed arrays. By providing one or more columns of transducers above and below any portion of the structure that could pierce the water surface, a bubble-coalescing standing wave field will always be resident in the area of bubble formation.

Although the present invention has been explained relative to a particular embodiment thereof, it is not so limited. For example, any configuration of one or more columns of transducers can be used. The size, operating frequency, etc. of the transducers can be scaled or tailored for a particular application. The transducers could be powered continuously or in a time-varying manner to produce a spectrum of bubble sizes over time. Acoustic lenses could be coupled to each transducer to focus energy or extend the region of spatial coverage. Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A system for coalescing bubbles in the wake of a structure piercing the surface of the water, comprising:

a first plurality of acoustic sources mounted to said structure for producing a corresponding first plurality of plane waves angled in a first direction, said first plurality of acoustic sources spaced along at least one plane that pierces the surface of the water; and a second plurality of acoustic sources mounted to said structure for producing a corresponding second plurality of plane waves angled in a second direction, said second plurality of acoustic sources spaced along said at least one plane that pierces the surface of the water, wherein said first plurality of plane waves and said second plurality of plane waves intersect to create a plurality of standing wave fields both above and below the surface of the water, wherein:

said first direction is oriented downward with respect to the surface of the water;

said second direction is oriented upward with respect to the surface of the water; and said second plurality of acoustic sources being interleaved with said first plurality of acoustic sources.

2. A system as in claim 1 wherein said first plurality of plane waves and said second plurality of plane waves are angled with respect to the surface of the water by an angle that is approximately in the range of 15–75°.

3. A system as in claim 2 wherein said angle is approximately 45° for both said first plurality of plane waves and said second plurality of plane waves.

4. A system for coalescing bubbles in the wake of a structure piercing the surface of the water, comprising:

a first plurality of acoustic sources mounted to said structure for producing a corresponding first plurality of plane waves angled in a first direction, said first plurality of acoustic sources spaced along at least one plane that pierces the surface of the water; and a second plurality of acoustic sources mounted to said structure for producing a corresponding second plurality of plane waves angled in a second direction, said second plurality of acoustic sources spaced along said at least one plane that pierces the surface of the water, wherein said first plurality of plane waves and said second plurality of plane waves intersect to create a plurality of standing wave fields both above and below the surface of the water, wherein each of said standing wave (fields has a wavelength that is at least approximately five times the diameter of said bubbles to be coalesced.

5. A system for coalescing bubbles in the wake of a structure piercing the surface of the water, comprising:

a first plurality of acoustic sources mounted to said structure for producing a corresponding first plurality of plane waves angled in a first direction, said first plurality of acoustic sources spaced along at least one plane that pierces the surface of the water;

a second plurality of acoustic sources mounted to said structure for producing a corresponding second plurality of plane waves angled in a second direction, said second plurality of acoustic sources spaced along said at least one plane that pierces the surface of the water, wherein said first plurality of plane waves and said second plurality of plane waves intersect to create a plurality of standing wave fields both above and below the surface of the water;

a pivoting mount coupling said structure to each of said first plurality of acoustic sources and said second plurality of acoustic sources; and a controller coupled to each said pivoting mount for providing a control signal to control an angular position thereof, wherein the angle of each of said first plurality of acoustic sources and each of said second plurality of acoustic sources is controlled.

6. A system for coalescing bubbles produced in an area just below the ventilation cavity of a wake created by a moving structure that pierces the surface of the water, comprising:

a first plurality of acoustic sources pivotally mounted to said structure for producing a corresponding first plurality of plane waves angled downward at the same angle with respect to the surface of the water, said first plurality of acoustic sources spaced along at least one plane that pierces the surface of the water, wherein at least a portion of said first plurality of plane waves pass through said area just below the ventilation cavity; and a second plurality of acoustic sources pivotally mounted to said structure for producing a corresponding second plurality of plane waves angled upward at the same angle with respect to the surface of the water, said second plurality of acoustic sources spaced along said at least one plane that pierces the surface of the water and interleaved with said first plurality of acoustic sources, wherein at least a portion of said second plurality of plane waves pass through said area just below the ventilation cavity, and wherein said first plurality of plane waves and said second plurality of plane waves intersect to create at least one standing wave field in said area just below the ventilation cavity.

7. A system as in claim 6 wherein said first plurality of plane waves and said second plurality of plane waves are angled with respect to the surface of the water by an angle that is approximately in the range of 15–75°.

8. A system as in claim 7 wherein said angle is approximately 45° for both said first plurality of plane waves and said second plurality of plane waves.

9. A system as in claim 6 wherein said first plurality of plane waves and said second plurality of plane waves are the same frequency.

10. A system as in claim 6 wherein each of said standing wave fields has a wavelength that is at least approximately five times the diameter of said bubbles to be coalesced.

11. A system as in claim 6 wherein said first plurality of plane waves intersect said second plurality of plane waves at right angles to one another.

12. A system as in claim 6 further comprising means coupled to each of said first plurality of acoustic sources and each of said second plurality of acoustic sources for changing the angle thereof with respect to the surface of the water.

13. A system as in claim 12 wherein said first plurality of plane waves and said second plurality of plane waves are angled with respect to the surface of the water by an angle that is approximately in the range of 15–75°.

14. A system as in claim 13 wherein said angle is approximately 45° for both said first plurality of plane waves and said second plurality of plane waves.

15. A system as in claim 12 wherein each of said standing wave fields has a wavelength that is at least approximately five times the diameter of said bubbles to be coalesced.

16. A system as in claim 12 wherein said first plurality of plane waves intersect said second plurality of plane waves at right angles to one another.

* * * * *